Oct. 5, 1965  A. R. D'ALBA  3,209,384

WINDSHIELD CLEANING APPARATUS

Filed Aug. 26, 1963  2 Sheets-Sheet 1

INVENTOR.
ANTHONY R. D'ALBA
BY
E. Herbert Liss
ATTORNEY.

Oct. 5, 1965    A. R. D'ALBA    3,209,384
WINDSHIELD CLEANING APPARATUS
Filed Aug. 26, 1963    2 Sheets-Sheet 2

INVENTOR.
ANTHONY R. D'ALBA
BY
E. Herbert Liss
ATTORNEY.

United States Patent Office 3,209,384
Patented Oct. 5, 1965

3,209,384
WINDSHIELD CLEANING APPARATUS
Anthony R. D'Alba, Williamsville, N.Y., assignor to Trico Products Corporation, Buffalo, N.Y.
Filed Aug. 26, 1963, Ser. No. 304,431
8 Claims. (Cl. 15—250.02)

The present invention relates to a windshield cleaning system and, more particularly, to an improved windshield cleaning system which utilizes a springless pump having a minimum number of parts. In cleaning systems for motor vehicles pumps have been employed for projecting solvent from a reservoir onto a windshield which are powered by the wiper motor. These pumps are generally complex structures and require complex power transmission means to actuate them. The prior art pumps for windshield cleaning apparatus comprise many movable parts and require complex structure for disengaging or interrupting pump operation. Even so, one or more of the parts associated with the pump remains in operation when the pump is not operating, resulting in unnecessary wear and substantial load loss on the motor.

For purposes of economy and long life, it is desirable to utilize a pump having a minimum number of parts in which all moving parts are completely inactive when the washer is not being utilized. It is also desirable to utilize a pump in which all of the windshield cleaning solvent is completely discharged when the pump is not operating to avoid the destructive consequences of freezing of the solvent within the pump which can occur in a pump left in a charged condition while at rest. Freezing of the solvent within the pump can result in injury to either the pump or the motor or both when the system is re-actuated.

The present invention utilizes in a windshield cleaning system a simple pump utilizing a single moving part, namely, the pump piston and piston rod assembly with valving on the charging and discharging ports. Reciprocation is achieved without the use of springs and there is no fluid retained in the pump since the pump chamber is entirely evacuated of washer solvent when it is at rest. The piston rod remains out of contact with its actuator when the pump is not being operated. Thus, the paradoxical, but desirable objectives of economy with improved efficiency and simplicity with improved ruggedness and lengthened life are achieved by the present invention.

The principal object of the present invention is to provide an improved windshield cleaning system utilizing a pump having a minimum number of parts.

Another object of the invention is to provide an improved windshield cleaning system utilizing a pump having a minimum number of parts in which reciprocation of the pump is achieved without the use of springs.

A further object of the invention is to provide an improved pump of simplified construction using a minimum number of parts powered by the wiper motor, but completely at rest and offering no load on the motor when not in operation.

A further object of the invention is to provide an improved pump in a windshield cleaning system which has a minimum number of moving parts; which has no parts in motion and which is completely evacuated of washer solvent while at rest.

Other objects and advantages of the invention will be apparent from the following detailed description taken in connection with the accompanying drawings in which.

Briefly, there is herein shown a windshield cleaning system which includes a wiper motor, a reservoir for windshield washer solvent and a nozzle for projecting the solvent to a windshield. The motor may be of any suitable type as, for example, vacuum, hydraulic or electric. The nozzle is preferably of the vibrating jet type disclosed in co-pending applicaiton Serial No. 304,474, filed August 26, 1963 by John R. Oisher and Anthony C. Scinta. It will, of course, be understood that in accordance with the broader aspects of the invention, any suitable or desirable type of nozzle may be employed and that a pair of nozzles may be utilized. The nozzle, pump and reservoir are connected by suitable conduits. The pump is a springless type pump which includes a housing having a piston assembly reciprocable therein and includes charge and discharge ports communicating with the interior of the housing. The piston assembly includes a piston and a rod which projects through an end of the housing and when in extended position is periodically engaged by a cam mounted on the output shaft of the motor, the wiper arm pivot shaft or any suitable location on the output transmission assembly of the windshield wiper. The cam is properly lobed to periodically engage the plunger and actuate the piston assembly in one direction and a selectively controllable source of energy is suitably associated with the pump to actuate the piston assembly to return in an opposite direction with spring-like action. This may include either porting for communicating with a source of vacuum or other fluid pressure means to create a pressure differential across the piston, or it may be a solenoid. Thus it can be seen that when suitable controls are actuated to permit vacuum to enter the housing when the wiper motor is energized, the pump will reciprocate to effect charging from the reservoir and discharging through the nozzle to project solvent onto the windshield. Likewise, if a solenoid is used, when the solenoid is energized and the motor is operating, reciprocation will be effected to cause washer operation. Since a greater force is applied by the cam in one direction than is applied by either the solenoid or the fluid pressure differential in the return direction, a spring-like pumping action is obtained without the use of springs, providing a simple and efficient pump with only a single moving part which is totally devoid of solvent and dormant when not in operation.

Figure 1:
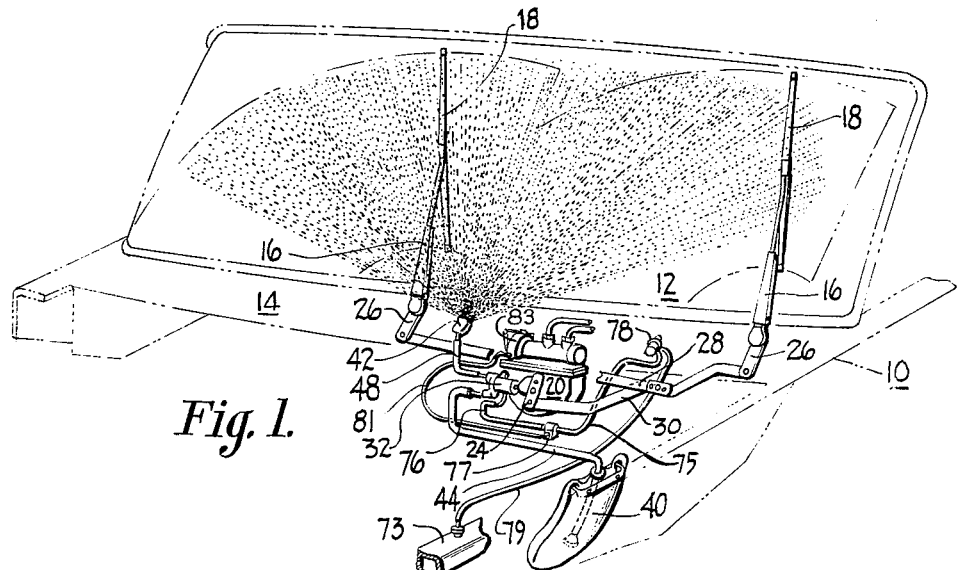
FIG. 1 is a fragmentary perspective view of an automotive vehicle incorporating the present invention.
Figure 2:
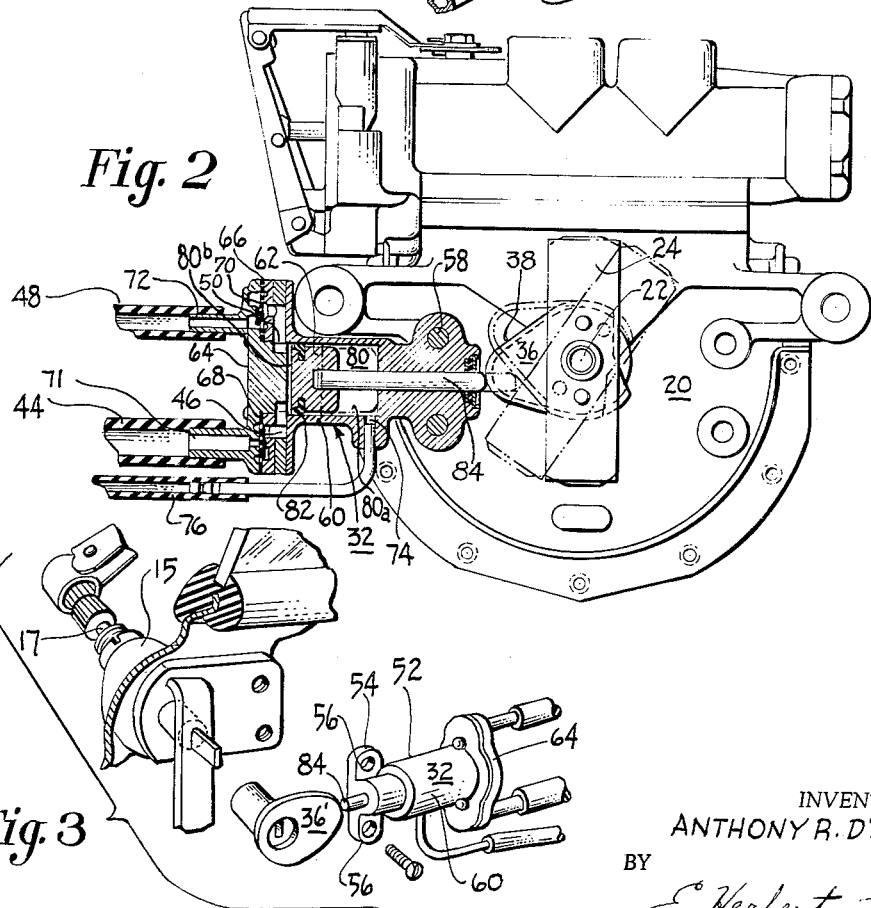
FIG. 2 is a front elevational view of a fluid wiper motor incorporating the pump of this invention, the pump being shown in longitudinal cross section.
Figure 5:
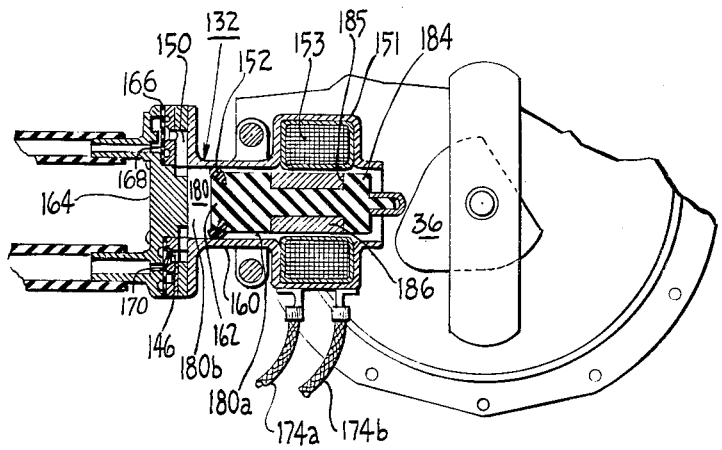
FIG. 5 is a cross sectional view of a modified form of the pump.

In FIG. 1 there is shown a fragmentary view of a motor vehicle 10 which includes a windshield 12 and a cowl 14. Suitably mounted on the cowl are a pair of pivot shaft assemblies 15. Mounted on each pivot shaft for movement therewith is a wiper arm 16. Each of the wiper arms have mounted at their free ends wiper blades 18 of suitable construction. A motor 20, which may be of any suitable type, is mounted on the fire wall of the vehicle below the cowl and may be a hydraulic motor as shown or any other suitable or desirable type as, for example, vacuum or electric. The motor includes an output shaft 22 connected to the wiper arm pivot shaft 17 by a suitable transmission assembly which includes the output shaft 22 and linkage. The linkage shown includes a motor crankarm 24 mounted on the output shaft 22 for rotation therewith and wiper arm pivot shaft crankarms 26 mounted on the inner ends of pivot shaft 17 for movement therewith. An elongated link 28 is pivotally connected at each end to the free ends of the crankarms 26. A link 30 is pivotally connected at one end to the motor crankarm 24 and at its other end to the elongated link 28. As seen in FIGS. 1, 2 and 5, a pump 32 is mounted on the housing of motor 20 and has a plunger rod 84 extending outwardly toward the pivot shaft 22. Mounted on the pivot shaft 22 is a cam 36 suitable lobed as, for example, at 38 to engage plunger rod 34 and to drive it from its extended position to its innermost position. A solvent reservoir 40 is suitably mounted on the body portion of the motor vehicle 10 and a nozzle 42 is suitably mounted on the cowl of the vehicle 10. A conduit 44 connects the charging port 46 of the pump 32 with the solvent reservoir 40 and a conduit 48 connects the discharging port 50 of the pump 32 with the nozzle assembly 42.

A pump housing 52 comprises a substantially cylindrical body portion 60 enclosing a chamber 80 for receiving a reciprocating piston or movable wall 62 slidably therein. At one end of body portion 60 is disposed a bracket portion 54 having attaching ears 56 with openings therethrough for reception of bolts or rivets 58. At the other end of the piston body 60 are located charging and discharging ports 46 and 50, respectively, and a separable closure 64. A gasket 66 is interposed between the closure 64 and the end portion of the housing which includes the charging and discharging ports 46 and 50. The gasket is formed with check valves 68 and 70 for charging and discharging ports 46 and 50, respectively. The check valves 68 and 70 permit passage of fluid through the intake port and prevent passage of fluid through the discharge port during the intake stroke of the piston 60 and prevent passage of fluid through the charging port 46 and permit passage of fluid through the discharge port 50 during the discharge stroke of the piston or movable wall 62. The closure member 64 includes a nipple 71 in communication with the intake port 46 and a nipple 72 in communication with the discharge port 50.

In the modifications shown in FIGS. 1, 2, 3 and 4, a port 74 is provided in communication with the cylindrical body portion 60 of the housing 52, which port is connected through a conduit 76 to a vacuum source as, for example, the intake manifold 73 of a vehicle engine. Conduit 76 may be connected to the vacuum source through a timer valve 77, a conduit 75, a suitable control 78 mounted within convenient reach of the vehicle operator and a conduit 79. Control 78 may be suitably connected to the wiper motor through conduit 75, timer valve 77, conduit 81 and through motor coupler 83 so that in one position thereof initiation of wiper motor operation and communication of port 74 with a vacuum source may be achieved. The timer valve 77 and the vacuum actuated motor coupler may be of the type shown and described in detail in application Serial No. 242,167 filed December 4, 1962, now Patent No. 3,147,504, by John R. Oishei and Martin Bitzer. This timer permits the motor coupler to vent at a controlled rate thereby providing a selected number of wiper cycles subsequent to more rapid venting of the pump compartment 80a so when control 78 is moved to the "off" position the conduit 76 is vented to the atmosphere and timer 77 may be interposed in the wiper circuit so as to provide a given number of wiping cycles after venting the pump through conduit 76. It should also be noted that only initial evacuation on the dry side of piston or movable wall 62 is required to provide continuous pump operation until the pump housing is vented so that a check valve, not shown, may be interposed in the circuit to prevent venting of the housing 52 should vacuum in the intake manifold drop as, for example, during acceleration. Since, however, only very little vacuum is required for pump operation, a drop in intake manifold vacuum will not interfere with proper operation of the pump.

Piston or movable wall 62 is slidably disposed in chamber 80 of housing body 52 and divides the chamber 80 into a first compartment 80a, or dry side, and a compartment 80b, or solvent chamber. The piston includes a sealing ring 82 to prevent leakage of either solvent or air from compartment 80a to compartment 80b. A piston rod or plunger 84 extends through the end of the housing 52 remote from the charge and discharge ports 46 and 50. The plunger may be rigidly secured to the piston or movable wall 62 or may be disposed for engagement therewith but separable therefrom.

The operation of the cleaning system should now be apparent. When the control 78 is moved to a position where vacuum is admitted through conduit 76 to chamber 80a and where wiper motor operation is initiated through conduit 81 the piston or movable wall 62 will be drawn to the right from the solid line position to the dotted line position, as seen in FIG. 2, causing engagement of the plunger rod 84 with the cam 36 and drawing fluid from the reservoir 40 through the conduit 44 to the chamber 80b. As the motor rotates, the cam 36 will engage the plunger rod 84, driving it to the left, as seen in FIG. 2, effecting a discharging stroke. As the piston is driven to the FIG. 2 position, fluid is discharged through the discharge port 50 and conduit 48 and through the nozzle 42 and is projected onto the windshield 12. It should be noted that on the discharge stroke the volume of chamber 80a is increased thereby tending to increase the effective vacuum and on the intake stroke the volume of chamber 80a is decreased tending to decrease the effective vacuum. Thus as the piston or movable wall 62 is driven by the cam 36 further to the left (FIG. 2), the force tending to bias the plunger rod 84 against the cam increases acting like a spring in tension. So long as the motor continues to rotate and the compartment 80a is not vented to the atmosphere, the pump will continue to operate in this manner. When the control 78 is moved to a position to vent the conduit 76 and chamber 80a, a suitable timing device such as for example timer valve 77 may be provided to provide a selected number of motor oscillations after pump action has ceased. The cam 36 will then drive the piston or movable wall 62 to its discharge position, completely discharging all fluid within the compartment 80b of chamber 80 and the pump will remain in this position until the control 78 is again moved to initiate washer pump action. If the motor alone is energized, no load will be carried by it due to the pump or any of the pump elements, since plunger rod 84 will remain in its innermost position out of contact with cam 36.

Although the pressure differential across the piston 62 is utilized to provide energy for producing a force to bias the piston 62 against the cam 36, it will of course be apparent that in accordance with the broader aspects of the invention, other energy sources may be utilized to actuate the piston. For example, the direction of extension of the plunger rod 84 may be reversed and a fluid pressure source may be utilized to supply super-atmospheric pressure through conduit 76 and port 74 to chamber 80b.

A further example of a type of energy which may be utilized to apply a return force to the piston is disclosed in the modification illustrated in FIG. 5. In this modification a source of electrical energy is utilized to energize a solenoid. In this modification a pump 132 comprises a pump housing 152 which includes a substantially cylindrical body portion 160 having a charging port 146 and a discharging port 150 at one end, which end is sealed by a closure 164. A gasket 166 is interposed between closure 164 and the end of the housing and is provided with check valves 168 and 170 for the charging and discharging ports. Adjacent its other end the pump housing body 160 has an enlarged annular portion 151. Disposed within the annular portion 151 is a toroidal solenoid coil 153. Disposed within the cylindrical body portion 160 is a piston 162 which divides the cylindrical chamber 180 into compartments 180a and 180b. Secured to the piston 162 integrally or in any suitable or desirable manner is a plunger rod 184 of non-magnetic material. The plunger rod 184 includes an annular recess 185 for receiving a solenoid coil or armature 186 by press fit or in any suitable manner. The coil is energized through conductors 174a and 174b. The operation of the pump disclosed in FIG. 5 is similar to the operation of the FIG. 2 modification, but the return force is produced by continuous energization of the solenoid coil 153 to bias the plunger rod 184 against the cam 36.

Figure 4:
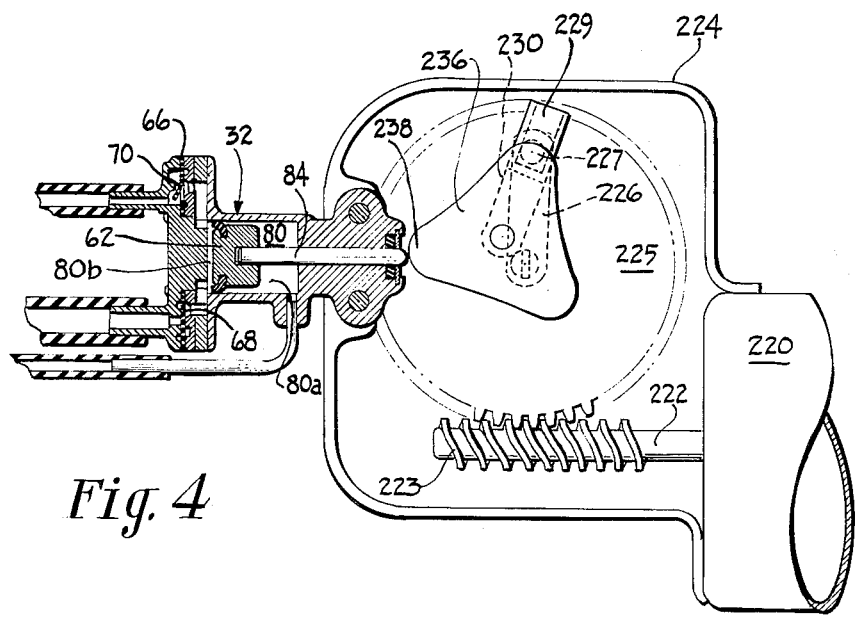
FIG. 4 is a sectional view of a rotary motor incorporating the pump of this invention.

In FIG. 4 there is shown a modification of the invention used with a rotary motor which may be an electric motor rather than an oscillating motor as shown in FIGS. 1 and 2. In this embodiment, the pump 32 shown is identical to the pump disclosed in FIG. 2 and it will of course be understood that the pump 132 of the FIG. 5 embodiment could be equally as well utilized. The motor 220 has an output shaft 222 with a worm gear 223 formed thereon. The worm gear 223 extends to a gear box 224 which has rotatably mounted therein a worm wheel 225 disposed for engagement with the worm gear 223. A radially extending arm 226 is mounted on the worm wheel 225 for rotation therewith and has at its free end a pin 227 for pivotal and slidable movement in a channel 229. The channel 229 is mounted on an arm 230 which, in turn, is mounted on a multi-lobed cam 236 having a plurality of lobes 238. The cam 236 is mounted for rotation within the gear box 224. Thus, it can be seen that when the motor 220 rotates, causing the worm gear 223 to rotate the worm wheel 225, pin 227 in engagement with channel 229 effects rotation of the cam 236, thereby driving the plunger rod 84 of pump 32. Thus, operation of the pump is identical to the FIG. 2 modification. Each time a lobe 238 engages the plunger rod 84, a pump discharge stroke is effected. The evacuated chamber 80b results in a pressure differential across piston 62 causing the piston to be biased against the cam 236 in a spring-like manner.

Figure 3:
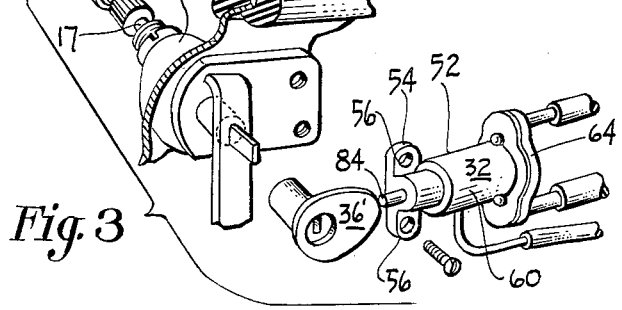
FIG. 3 is an exploded perspective view illustrating the pump actuated by a cam mounted on the wiper arm pivot shaft.

In an embodiment shown in FIG. 3, a cam 36' is provided on the inner end of the wiper arm pivot shaft 17 and the pump 32 is mounted adjacent thereto for engagement with the cam 36'. Thus, when the wiper motor, either a rotary type or oscillating type, is operating, the cam 36' is caused to engage the plunger rod 84 of the pump 32 when the chamber 80a is evacuated. The operation is then identical to the operation of the system shown in FIG. 2. It will of course be understood that a solenoid pump of the type shown in FIG. 3 may be employed in this embodiment.

It should now be apparent that an improved windshield cleaning system has been provided which is of simple but rugged construction and which has only a single moving part with a charging and discharging port. Certain specific embodiments and modifications of the invention have been described for the purpose of illustration, but it will be apparent that various modifications and other embodiments are possible within the scope of the invention. For example, the cam for driving the plunger rod may be mounted in any suitable place on the movable linkage and other and different types of energy sources may be utilized for providing energy for effecting this spring-like action of the piston. It is to be understood, therefore, that the invention is not limited to the specific arrangements shown, but in its broadest aspects it includes all equivalent embodiments and modifications which come within the scope of the invention.

What is claimed is:

1. Windshield cleaning apparatus comprising a pump, a solvent reservoir, a discharge nozzle, conduit means connecting said pump, said reservoir and said nozzle whereby solvent is drawn from said reservoir by said pump and discharged through said nozzle to a windshield, said pump comprising a housing, a piston reciprocable therein, said housing including a solvent discharge port and a solvent charging port on one side of said piston, plunger means extending outwardly through said housing disposed on the other side of said piston for driving said piston in a first direction, means for periodically transmitting a force to said plunger in said first direction, a port adapted to be connected to a vacuum source communicating with other side of said piston for producing a pressure differential across piston to apply a force on said piston in a second direction opposite to said first direction, the applied force through said plunger to said piston in said first direction exceeding the force in said second direction produced by said vacuum, whereby said piston is reciprocated by the periodic force transmitted in said first direction and returned in said second direction with spring-like action by the force produced by the pressure differential across said piston.

2. Windshield cleaning apparatus comprising a pump, a solvent reservoir, a discharge nozzle, conduit means connecting said pump, said reservoir and said nozzle whereby solvent is drawn from said reservoir by said pump and discharged through said nozzle to a windshield, said pump comprising a housing, a piston reciprocable therein, said housing including a solvent discharge port and a solvent charging port on one side of said piston, plunger means extending outwardly through said housing disposed on the other side of said piston for driving said piston in a first direction, means for periodically transmitting a force to said plunger in said first direction, a port adapted to be connected to a vacuum source communicating with other side of said piston for producing a pressure differential across piston to apply a force on said piston in a second direction opposite to said first direction, the applied force through said plunger to said piston in said first direction exceeding the force in said second direction produced by said vacuum and operator controlled means for venting said port to interrupt pump operation and to dispose said piston in its discharge position when operation is interrupted, whereby said piston is reciprocated by the periodic force transmitted in said first direction and returned in said second direction with spring-like action by the force produced by the pressure differential across said piston.

3. In a windshield cleaner comprising a wiper motor having output means including a shaft and a transmission assembly for driving the windshield wiper arm, a solvent reservoir, a solvent discharge nozzle, a solvent pump and conduits connecting said reservoir, said pump and said discharge nozzle; the combination comprising said pump, said pump including a housing, a piston slidable in said housing and dividing said housing into first and second compartments, a plunger rod engageable with said piston and extending outwardly through said first compartment, means communicating with said first compartment for selectively applying continuous vacuum or atmospheric pressure thereto, said second compartment having a solvent discharge port and a solvent charging port communicating therewith and cam means powered by said motor periodically engageable with the outer end of said plunger rod when vacuum is applied to said first compartment whereby the piston is reciprocated in said housing to draw solvent from said reservoir and to discharge the solvent through the discharge nozzle.

4. Windshield cleaning apparatus comprising a pump, a solvent reservoir, a discharge nozzle, conduit means connecting said pump, said reservoir and said nozzle whereby solvent is drawn from said reservoir by said pump and discharged through said nozzle to a windshield, said pump comprising a housing, a piston reciprocable therein, said housing including a solvent discharge port and a solvent charging port on one side of said piston, plunger means extending outwardly through said housing having an end engageable with said piston for driving said piston in a first direction, means for periodically transmitting a force to said plunger in said first direction, a port in said housing adapted to be connected to a fluid pressure source communicating with a side of said piston for producing a pressure differential across piston to apply a force on said piston in a second direction opposite to said first direction, the applied force through said plunger to said piston in said first direction exceeding the force in said second direction produced by said fluid pressure source and operator controlled means for venting said port to interrupt pump operation and to dispose said piston in its discharge position when operation is interrupted, whereby said piston is reciprocated by the periodic force transmitted in said first direction, returned in said second direction with spring-like action by the force produced by the pressure differential across said piston.

5. In windshield cleaning apparatus comprising a solvent reservoir, a discharge nozzle, a pump and conduit means connecting said pump, said reservoir and said nozzle; the combination comprising a pump housing assembly including a plunger rod extending outwardly of said housing and a piston reciprocable within said housing, said pump housing including a charging port and a discharging port, said plunger rod being disposed adjacent a movable element of a wiper motor output means whereby said output means actuates said plunger rod to periodically effect movement of said piston in one direction when said pump is energized, selectively controllable fluid pressure means for energizing said pump and for applying a returning force to said piston in an opposite direction and connecting means for connecting said selectively controllable fluid pressure means to a source of fluid pressure.

6. In windshield cleaning apparatus comprising a pump, a solvent reservoir, a discharge nozzle and conduit means connecting said pump, said reservoir and said nozzle; the combination comprising a pump housing assembly including a plunger rod extending outwardly of said housing operatively engageable with a piston reciprocable within said housing, said pump housing including a charging port and a discharging port disposed on one side of said piston, mechanical means engageable with said plunger rod for moving said piston in one direction, means for initially moving said plunger rod in an opposite direction into engagement with said mechanical means, means disposed on the other side of said piston for communicating with an atmospheric vent, means for selectively closing and opening said vent, whereby a stroke of said piston in said one direction creates a reduction in pressure on said other side of said piston when said vent is closed to produce in cooperation with said charging port a pressure differential across said piston effective to move said piston in said opposite direction.

7. In windshield cleaning apparatus comprising a pump, a solvent reservoir, a discharge nozzle and conduit means connecting said pump, said reservoir and said nozzle; the combination comprising a pump housing assembly including a plunger rod extending outwardly of said housing operatively engageable with a movable wall reciprocable within said housing, said pump housing including a charging port and a discharging port disposed on one side of said movable wall, mechanical means operatively engageable with said plunger rod for moving said movable wall in one direction, means disposed on the other side of said movable wall for communicating with an atmospheric vent, control means for applying an energy pulse effective to bias said movable wall and said plunger rod in a direction opposite said one direction for initially energizing said pump, said control being also operable to selectively close and open said vent to the atmosphere, whereby a stroke of said movable wall in said one direction creates a reduction in pressure on said other side of said movable wall when said vent is closed to produce in cooperation with said charging port a pressure differential across said movable wall effective to move said movable wall in a direction opposite said one direction.

8. In windshield cleaning apparatus comprising a pump, a solvent reservoir, a discharge nozzle and conduit means connecting said pump, said reservoir and said nozzle; the combination comprising a pump housing assembly including a plunger rod extending outwardly of said housing operatively engageable with a movable wall reciprocable within said housing, said pump housing including a charging port and a discharging port disposed on one side of said movable wall, mechanically driven cam means operatively engageable with said plunger rod for periodically moving said movable wall in one direction, means disposed on the other side of said movable wall for communicating with an atmospheric vent, control means for applying an energy pulse effective to bias said movable wall and said plunger rod in a direction opposite said one direction for initially energizing said pump, said control being also operable to selectively close and open said vent to the atmosphere, whereby a stroke of said movable wall in said one direction creates a reduction in pressure on said other side of said movable wall when said vent is closed to produce in cooperation with said charging port a pressure differential across said movable wall effective to move said movable wall in a direction opposite said one direction.

References Cited by the Examiner

UNITED STATES PATENTS

| | | | |
|---|---|---|---|
| 2,953,801 | 9/60 | Garvey | 15—250.02 |
| 3,011,199 | 12/61 | Schrade et al. | 15—250.02 |

FOREIGN PATENTS

| | | |
|---|---|---|
| 1,060,728 | 7/59 | Germany. |
| 860,087 | 2/61 | Great Britain. |

CHARLES A. WILLMUTH, *Primary Examiner.*